United States Patent [19]

Hawkins

[11] Patent Number: 4,605,970
[45] Date of Patent: Aug. 12, 1986

[54] METHOD AND APPARATUS FOR CALIBRATING AN OPTICAL DOCUMENT DIGITIZER

[75] Inventor: Jeffrey A. Hawkins, Lake Oswego, Oreg.

[73] Assignee: Tektronix, Inc., Beaverton, Oreg.

[21] Appl. No.: 657,285

[22] Filed: Oct. 1, 1984

[51] Int. Cl.[4] .............................................. H04N 1/36
[52] U.S. Cl. .................... 358/265; 358/290; 358/289; 358/264
[58] Field of Search ............... 358/256, 264, 265, 289, 358/290, 291

[56] References Cited

U.S. PATENT DOCUMENTS

| | | | |
|---|---|---|---|
| 3,849,592 | 11/1974 | Rosenheck | 358/289 |
| 4,506,301 | 3/1985 | Kingsley et al. | 358/280 |
| 4,543,615 | 9/1985 | van Campenhont et al. | 358/285 |

FOREIGN PATENT DOCUMENTS 57-99079  6/1982  Japan .................................. 358/264

Primary Examiner—James J. Groody
Assistant Examiner—Edward L. Coles
Attorney, Agent, or Firm—David P. Petersen; Francis I. Gray; Robert S. Hulse

[57] ABSTRACT

A calibration strip (80) is described for use in calibrating an optical document digitizer. The strip (80) includes an optically detectible pattern including plural discrete blocks (82) with orthogonal first and second edges (84, 86). Edges (84) are parallel to the drum axis when strip (80) is mounted to the drum (10). As the drum (10) rotates, these first edges (84) are detected and provide a reference for a Y-coordinate axis. With the drum (10) stopped, the second edges (86) are detected by a scanning array (53), as it is stepped by a motor (60) along an X-coordinate axis. The microstep location of each of the detected edges (86) is stored. During document scanning, the array (53) moves along the X-axis to the known microstep locations. The strip (80) has shaft indexing and optics magnification patterns (210, 212).

16 Claims, 9 Drawing Figures

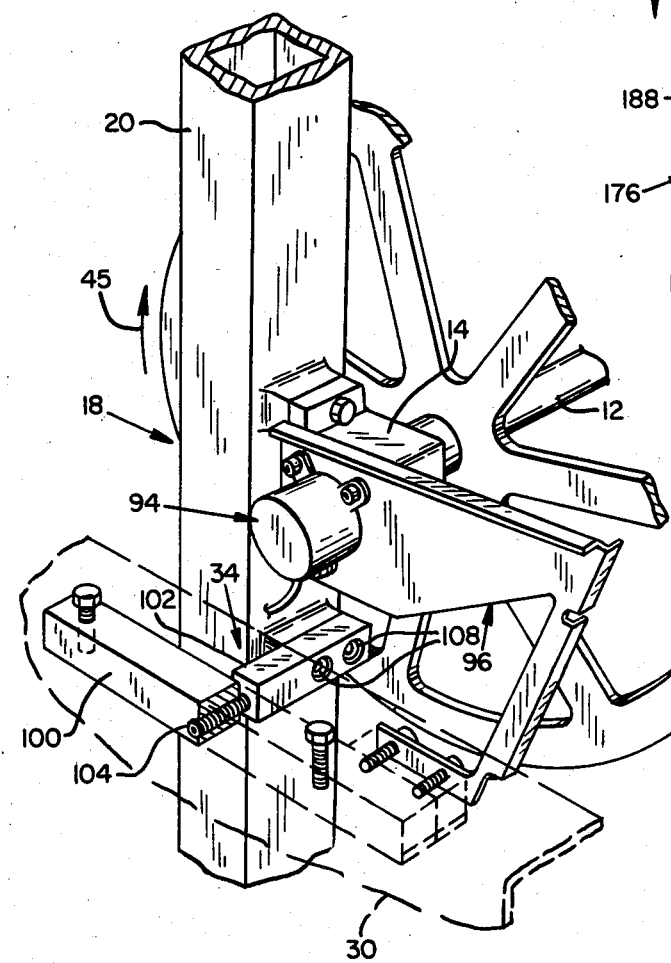
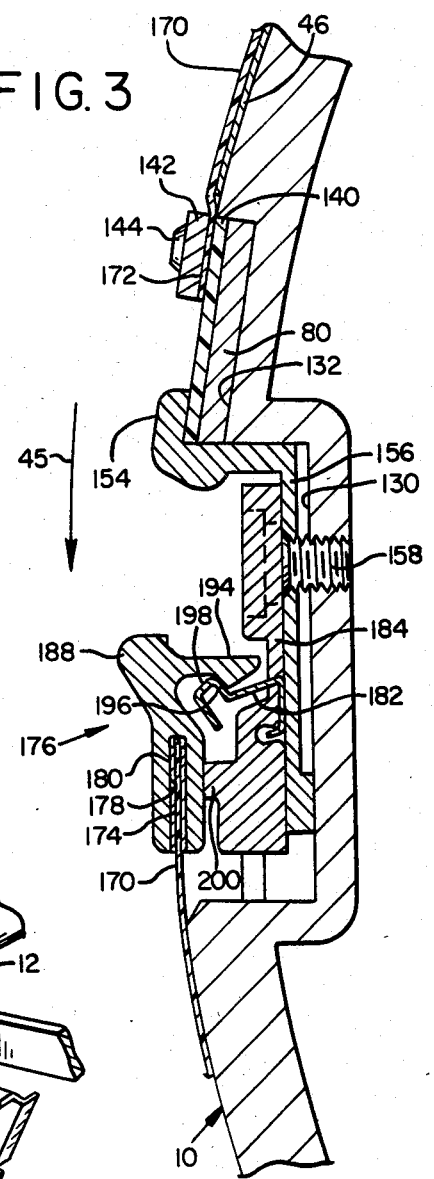

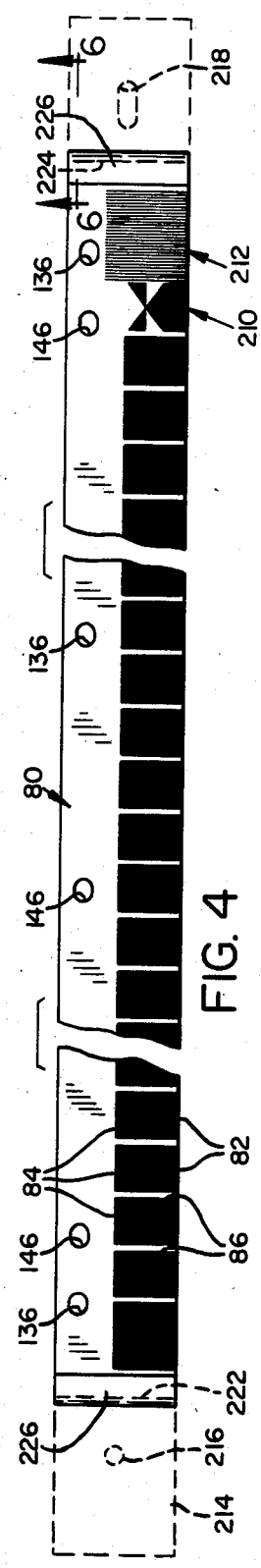
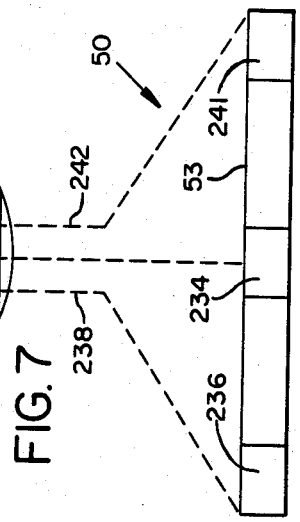
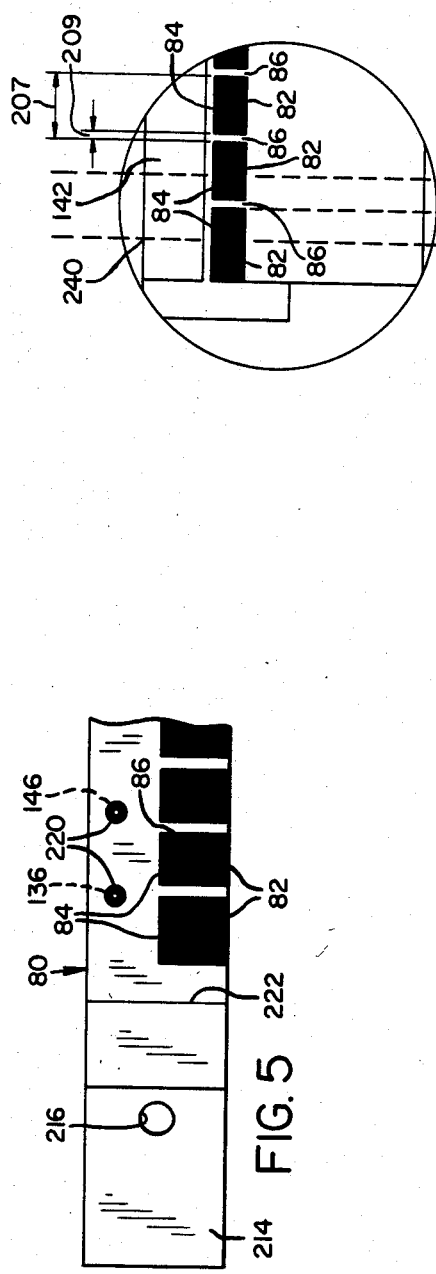

METHOD AND APPARATUS FOR CALIBRATING AN OPTICAL DOCUMENT DIGITIZER

TECHNICAL FIELD

The present invention relates to a method and apparatus for calibrating an optical document digitizer and for establishing an orthogonal reference coordinate system for the digitizer. More particularly, the invention relates to such a method and apparatus in which a calibration mechanism is mounted to a rotatable drum of the digitizer for this purpose.

BACKGROUND OF THE INVENTION

Devices for digitizing documents, by converting images on the document into digital data form for subsequent use in reprinting a copy of the original, have heretofore been known. In such systems, a light source is typically directed toward the document while an array of photo detectors scans the document. During scanning, the array detects light reflected from the images on the document. Digital data is generated corresponding to the detected light, and thus to the images. In such devices, it is important to identify the location on the document from which data is being generated relative to a reference location. Unless there is a one-to-one correspondence between locations of a print from which data is being digitized and corresponding locations of a copy of the print subsequently reproduced from the data, the copy does not duplicate the original.

In one prior art apparatus, original prints are mounted to a rotatable drum and then optically scanned by a scanner as the drum rotates. As the drum is rotated, the optical scanner is linearly shifted in a direction parallel to the axis of the drum. This direction corresponds to the X-coordinate axis of a two-dimensional cartesian coordinate system. In order to accurately monitor the position of the scanner along the X-axis, relatively expensive feed-back systems, such as laser feedback systems, have been employed.

Although not known to be utilized in an optical digitizing apparatus, one device used in monitoring positions along a single axis comprises a digital readout apparatus for a milling machine produced by the Sony Corporation and designated the Magnascale LF-200. This apparatus utilizes a metal bar which is magnetically coded along its length with a position indicating code. A sensor is shifted along the bar and reads the code. From these readings, the position of the sensor along the bar, relative to a reference position, is known.

To establish a Y-coordinate axis for digitization of a document, one prior art approach employs an expensive mounting mechanism for the optical scanner. This mounting mechanism guides the linear movement of the scanner along a line which precisely parallels the drum axis. Then, with the scanner at a given linear position and as the drum rotates, the scanner scans the print in a Y-coordinate axis direction. However, if the scanner mounting mechanism does not move the scanner along a line which is virtually exactly parallel to the drum axis, the data is incorrectly shifted in the Y-axis direction relative to data from adjacent scans of the document. As a result, reproduced copies of the original have distorted images.

Therefore, a need exists for a relatively inexpensive apparatus which reliably calibrates an optical digitizer, and which establishes an orthogonal reference coordinate system for the digitizer, without the need for costly scanner mounting mechanisms.

SUMMARY OF THE INVENTION

In accordance with the present invention, a calibration mechanism is provided for calibrating the linear movement of an optical scanning array in a direction corresponding to the X-axis of a cartesian coordinate system. The mechanism also establishes a reference for a Y-coordinate axis of the coordinate system. More specifically, the calibration mechanism is designed for mounting to the surface of a rotatable drum. When so mounted, the X-coordinate axis is positioned in a direction parallel to the axis of the drum and the Y-coordinate axis is orthogonal to the X-axis, and extends circumferentially about the drum.

In a specific illustrated embodiment of the invention, the calibration mechanism comprises a calibration strip with a high resolution, high contrast, light and dark optical pattern on the strip. The optical pattern has plural discrete blocks, each with first and second orthogonal edges. The first edges of the blocks are precisely aligned. Also, when the strip is mounted to the drum, these first edges are precisely aligned with the axis of the drum and provides a scanning reference line for the Y-coordinate axis and trigger scanning in the Y-direction.

To achieve linear calibration of the drum along the X-axis, the drum is stopped and an optical scanner is positioned to view the calibration strip. The scanner is shifted in an X-axis direction along the strip, from a reference or origin location. As the scanner is shifted, the second edges are detected. In the illustrated embodiment, a step motor is used for this shifting and the microstep location, relative to the reference, associated with each of the detected second edges is recorded. Then, to position the scanning head at a given location along the X axis, the motor is simply stepped the number of steps associated with that location. Further detection of the second edges is not required until such time as the apparatus is again linearly calibrated.

As the drum is rotated, the scanner detects the first edges of the blocks as they pass the field of view of the scanner. Thus, these first edges provide a reference for a Y-coordinate axis. Also, scanning in the Y-direction commences upon detection of a first edge 84 by the scanner. Following scanning of one swath of data in the Y-axis direction, a swath being the width of the field of view of the scanner, the scanner is shifted linearly along the X-axis to an adjacent swath. Scanning of the adjacent swath starts after a first edge of the calibration strip is detected in this adjacent swath. In this manner, orthogonality of scanning in the Y-axis direction is maintained.

As still another feature of the invention, the calibration strip is provided with an indexing pattern utilized to relate the position of the calibration strip on the drum to an index position of an optical encoder which monitors the velocity of a drum supporting shaft.

As a further aspect of the present invention, a pattern for establishing the magnification of the scanner is also provided on the calibration strip.

It is accordingly one object of the invention to provide an improved method and apparatus for calibrating an optical document digitizing apparatus.

It is another object of the invention to provide such a method and apparatus for calibrating an optical document digitizing apparatus in a first direction, corresponding to the X-axis of a cartesian coordinate system.

A further object of the present invention is to provide such a method and apparatus which establishes an orthogonal coordinate system without the need for a complicated and expensive scanner mounting system.

It is still another object of the present invention to provide such an apparatus and method which is relatively mechanically simple, reliable, accurate and inexpensive to produce.

These and other features, objects and advantages of the present invention will become apparent with reference to the following description and drawings.

BRIEF DESCRIPTION OF THE DRAWINGS

FIG. 2 is an isometric view of a portion of one end of the digitization apparatus of FIG. 1;

FIG. 3 is a cross sectional view through the calibration strip taken along lines 3—3 of FIG. 1;

FIG. 4 is a partially broken away top plan view of the calibration strip of FIG. 1;

FIG. 5 is a top plan view of a portion of the calibration strip of FIG. 1, showing the strip at an intermediate step of its manufacture;

FIG. 6 is a side elevational view of the calibration strip of FIG. 4, taken along lines 6—6 thereof;

FIG. 7 is a schematic view which illustrates optical scanning of the calibration strip of FIG. 1;

DETAILED DESCRIPTION OF PREFERRED EMBODIMENT

Figure 1:
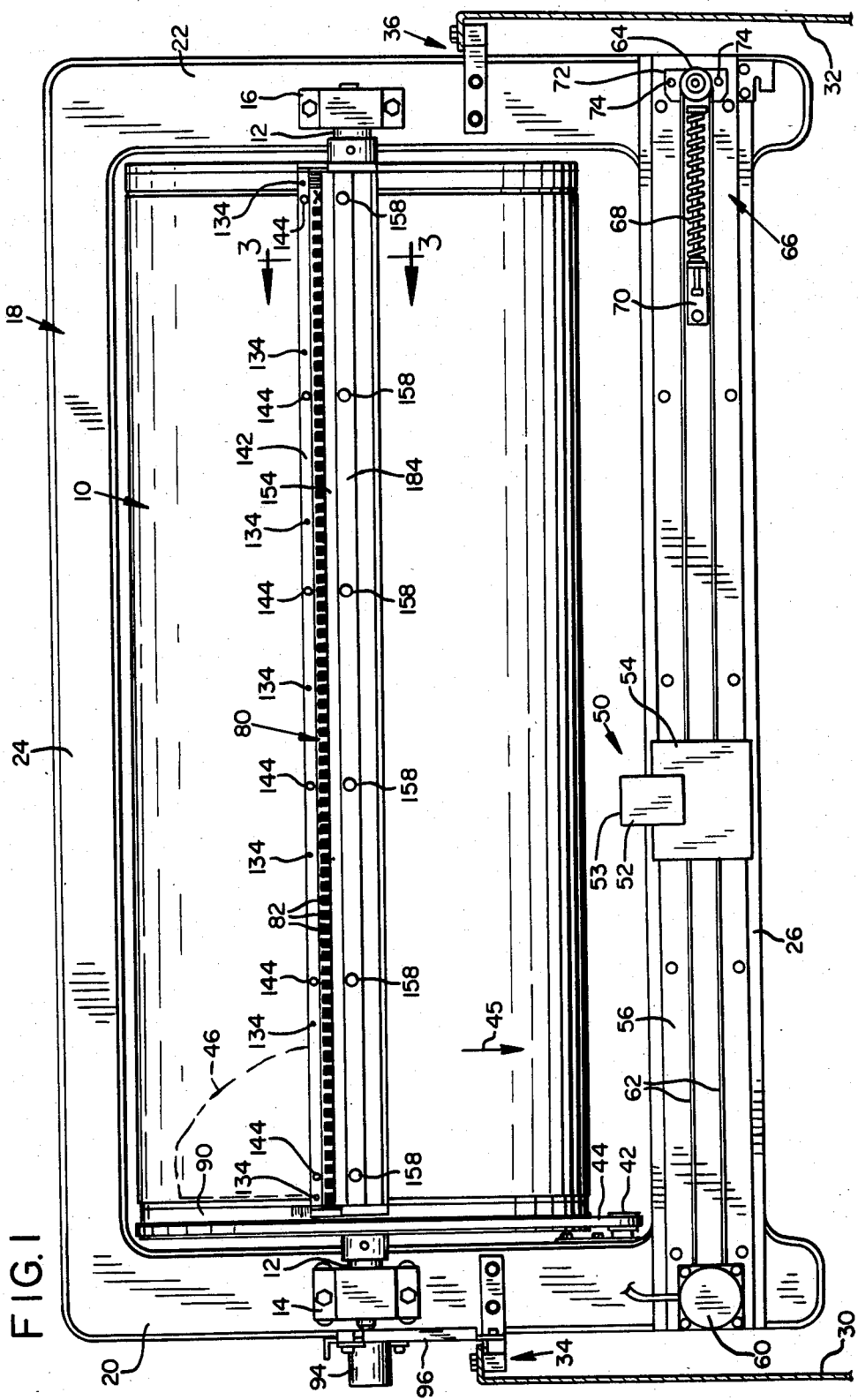
FIG. 1 is a front elevational view of an optical document digitizing apparatus with one form of a calibration strip in accordance with the present invention.

With reference to FIG. 1, an optical document digitizor apparatus is shown for converting images from charts, graphs, engineering drawings and other documents into digital data. The digitized data is used to produce reproductions of the originals. In general, the digitization apparatus includes an elongated cylindrical drum 10 having a central axial shaft 12. The shaft 12 is horizontally positioned and rotatably mounted at its respective ends, by bearings 14, 16 to an upright drum supporting frame 18. The frame 18 is comprised of spaced apart vertically extending side member portions 20, 22 which are interconnected by upper and lower transversely extending cross member portions 24, 26. First and second mounts 34, 36 connect the frame 18 to respective walls 30, 32 of a cabinet. In addition, a motor driven pulley 42 is drivingly connected by a drive belt 44 to one end of the drum 10 for driving the drum in rotation in a direction indicated by arrow 45.

As the drum rotates, with an engineering drawing or other document 46 mounted thereto, the drum is scanned by an optical scanner head assembly 50 which includes an optical scanning system 52 mounted to a carriage 54. The scanning system 52 is conventional and includes a light source together with a linear array 53 of photo detectors. For example, one suitable array is a one hundred twenty eight element CCD array manufactured by the Texas Instruments Company. A carriage arm 56 is mounted to the frame cross member 26 and slidably supports the carriage 54 for movement in a direction parallel to the axis of the drum 10. This direction corresponds to the X-axis of a two dimensional cartesian coordinate system.

A drive mechanism is provided for shifting the carriage 54, and thus the supported optical scanning system 52, along the carriage arm 56. In the illustrated form, this drive mechanism comprises a cable drive system, driven by a motor 60, and supported by the frame side member 20. The motor is operable to move a cable 62 about a pulley 64 at the opposite end of the carriage arm 56 from the motor. The carriage 54 is connected to the cable 62 so that, as the cable moves, the carriage 54 and supported optical system 52 is correspondingly moved.

A cable tensioning mechanism 66 is provided for adjusting the tension on cable 62 as desired. This mechanism includes a spring 68 mounted to apply pressure against a first bracket 70 which is rigidly fixed to the carriage arm 56 and against a second bracket 72 which carries the pulley 64. Bracket 72 is provided with slots, not shown, through which fasteners 74 selectively secure the bracket 72 to the carriage arm. When the fasteners 74 are loosened, the bracket 72 may be shifted to either compress or relax the spring 68 and thereby adjust the tension on the cable 62. Following the tension adjustment, the fasteners 74 are tightened.

Motor 60 may comprise a precision step motor, such as a DC Stepping Motor produced by Sigma Instruments, Inc. With such a motor, each time the carriage 54 is stepped along the X-axis the same number of incremental motor steps from a reference location, the carriage ends up in almost exactly the same X-coordinate position. That is, the cable drive system has the capacity of repeatedly delivering the carriage to the same location each time for a given number of steps, within a tolerance that is ±0.0005 inches. Any other type of drive system with a desired degree of repeatability may, of course, be employed. There are non-linearities in such a drive system. For example, cable 62 is not precisely of the same diameter along its length. Also, each drive increment or step from the motor 60 is not necessarily of the same length. Because of such nonlinearities, the linear or X-coordinate position of the carriage 54, and of the scanning system 52, cannot precisely be determined merely by counting the number of drive steps from the motor 60. Instead, linear calibration of the drive mechanism is needed in order to determine exactly how far along the carriage arm 56, and thereby along the X-axis, that the scanner head assembly 50 has travelled for any given number of motor drive steps. However, given the repeatability of the drive mechanism, after initial linear calibration, it is not necessary to recalibrate the apparatus each time that the scanner assembly 50 is moved along the carriage arm.

To accomplish this linear calibration, a calibration apparatus, which in the illustrated embodiment comprises a calibration strip 80, is mounted to the drum 10. In general, this calibration strip is provided with a high resolution, high contrast, optically detectable pattern of dark and light areas. This pattern includes plural spaced apart discrete black regions or blocks 82 on a white background. These blocks each have sharply defined scan triggering first edges 84 which, when the strip 80 is mounted to the drum 10, are precisely aligned with each other and with the axis of the drum. In addition, these blocks 82 have sharply defined second edges 86, which are orthogonal to the first edges 84, and thus to the drum axis.

With the drum stopped and the scanner array 53 viewing on the calibration strip, as the scanner head 50 is stepped by the motor 60, the edges 86 are detected. The microstep location of each edge 86 relative to a reference is recorded or stored by storage device 87, shown in block form in FIG. 1. When the number of steps required to reach a particular one of the edges 86 is known, the linear or X-coordinate position of this edge can subsequently be reached by stepping the motor the same number of steps from the reference position. Since the strip 80 is affixed to the drum 10, after this calibration is completed, the location of the scanning head 50 along the X-axis, that is along the axis of the drum, is known. Again, this location is established by the number of incremental steps utilized in positioning the scanning head along the carriage arm 56. The apparatus may be recalibrated in this manner as frequently as desired.

Therefore, when an engineering print 46, such as shown in dashed lines in FIG. 1, is mounted to the drum 10 for scanning, the X-coordinate of data being digitized from the print can readily be determined from the microstep positions of the scanning head 50.

In the illustrated document digitizer, the optical array 53 scans a swath of data from the drawing 46 as the drum is rotated. The width of the swath corresponds to the width of the field of view of the linear array 53 used in scanning. As the drum nears the completion of a revolution, the stepper motor 60 shifts the scanner head 50 along the carriage 56 to position the array 53 for scanning an adjacent swath of the drawing. In this manner, the scanner head 50 is linearly stepped in the X-direction across the drawing until the entire drawing has been scanned and digitized.

Incidentally, a visual representation of the Y-coordinate axis, for the user, is provided by a clear scale 90, marked off in inches and millimeters, which is located at the end of the drum adjacent to the belt 44.

In addition to providing for linear calibration of the apparatus, the calibration strip performs the function of providing an orthogonal view space for the optical array 53. As the drum 10 rotates, and with the array viewing on a particular swath, the array 53 detects a scan trigger edge 84 of a block 82 as the edge passes across the field of view of the array. The detection of this edge establishes a Y-coordinate reference for the swath. Digitization of data from the swath commences upon detection of the reference. Similarly, digitization of data from the other swaths is triggered upon detection of an edge 86. Thus, scanning in the Y-direction is referenced to the edges 86 and does not depend upon moving the scanning head 50 precisely along a line parallel to the drum axis. Moreover, assume that a document 46 happens to be placed on the drum in a skewed manner, for example, with the top and bottom edges of the document out of horizontal. In this case, because each swath of the data is digitized relative to the edges 84 of the calibration strip, the resulting data may still be used to generate copies of the original. For example, the data may be rotated in a well known manner to reorient the top and bottom edges of the copy just as if the top and bottom edges of the original print had been horizontal.

During scanning, the output of each photodetector of the array 53 is repeatedly integrated to provide digital data corresponding to the image on the portion of the print 46 which is scanned by the detector during the integration. More specifically, the print 46 is digitized into data corresponding to picture cells, pixels, of the print. The width of each pixel, in the X-direction, is set by the magnification of a lens of the optical assembly 52, and corresponds to the width of the view of an individual photodetector of the array. The height of each pixel, in the Y-direction, is established by the length of the portion of the print, in the Y-direction, which passes the photodetector during the integration time. As a specific example, these pixel elements may be squares of one-twelfth of a millimeter. When data corresponding to pixel elements of this size is generated, copies reproduced from the data are of a high quality. It is desirable to have pixels of equal height, that is with equal Y-axis dimensions. With this approach, given a Y-axis reference, which is established upon detection of a scan trigger edge 84 during scanning, the pixel elements from adjacent swaths will be properly aligned in the Y-direction when the data is reprinted. This is because reprinting commences from the common Y-axis reference and each of the pixel elements has the same Y-axis dimension.

To obtain pixels with equal Y-axis dimensions, the drum may be rotated at a constant velocity. In this case, by integrating over constant time intervals, pixels of the same Y-dimension are obtained. Alternately, the drum velocity may be monitored. In this case, integration time intervals are adjusted in response to variations in drum velocity so that pixels of the same height are scanned. That is, integration time is decreased as the drum velocity increases and increased with a reduction in drum velocity. This velocity monitoring may be accomplished by a commercially available rotary optical encoder 94, such as available from Dynamics Research Corporation and designated model number 152-011-1024-SK. Encoder 94 optically monitors the rotation of the shaft 12. Also, the circumference of the drum is divided into sections, with, for example, fifteen pixels being assigned to each sector. In addition, the optical encoder produces one output signal per sector. Therefore, given the time between such encoder outputs, the velocity of the drum can be determined. A mounting bracket 96 supports the encoder in alignment with the drum shaft 12 for performing this drum velocity monitoring.

With reference to FIGS. 1 and 2, it should be noted that the mounts 34 and 36 may rigidly connect the drum supporting frame 18 to the cabinet. Furthermore, the optical encoder 94 may also be rigidly mounted to the cabinet, such as to frame member 20. However, in the illustrated embodiment, an optional mounting system is employed. Specifically, although the mount 36 rigidly connects the frame side member 22 to the cabinet wall 32, the mount 34 is designed with a pivot. Thus, as can be seen in FIG. 2, the mount 34 includes a leg member 102 rigidly secured to the frame member 20 and a cross member 100 rigidly secured to the cabinet wall 30. A pivot 104 interconnects the members 100 and 102. When either the drum supporting frame 18 or cabinet is jarred, resulting vibrations induce minute pivoting movements of these components about the pivot 104. A mounting bracket 96 supports the encoder 94. Thus, the bracket 96 permits translation of optical encoder 94, but prevents the encoder from rotating about the pivot 104, in responce to such vibrations.

With reference to FIGS. 1 and 3, the mounting structure for the calibration strip 80, as well as the structure for holding prints to the drum will next be described. The drum is formed with a transversely extending channel 130. In addition, a calibration strip receiving recess 132, adjacent to channel 130, is provided along the length of the drum.

Plural calibration strip alignment pins 134 (FIG. 1) project outwardly from the base of the recess 132. These pins are mounted to the drum in precise alignment with the axis of the drum. For example, the pins are installed within 0.003 inches of exact alignment. When the calibration strip 80 is placed in the recess 132, as shown in FIG. 3, the pins 134 extend through corresponding openings 136 (FIG. 4) which are formed in the calibration strip during the manufacture of the strip. The openings 136 are sized for tight reception of the pins. The alignment of the openings 136 is controlled closely during the manufacture of the strip 80. Also, the distance between the center of the openings 136 and the edges 84 of the blocks 82 is closely controlled. As a result, when the strip 80 is mounted to the pins 134, the edges 84 of the blocks 82 are precisely aligned with the axis of the drum.

As shown in FIG. 3, a transparent covering strip 140, which may be of plastic, overlays the installed calibration strip 80 and prevents the strip from being damaged during use. The trailing edge of the cover strip 140, relative to the direction of the drum rotation indicated by arrow 45, is held against the drum by an elongated retainer 142 which is secured in place by screws 144. These screws pass through the covering strip 140 and through openings 146 (see FIG. 4) of the calibration strip 80. However, the screws 144 are sized smaller than the openings 146. As a result, these screws do not bind against the calibration strip. Therefore, they do not interfere with the alignment of the calibration strip by the pins 134. Also, the leading edge of the cover strip 140, is held against the calibration strip 80 by a lip 154 of a clamping element 156. The clamping element 156 is secured by fasteners 158 within the channel 130. Thus, the calibration strip 80 is held in place on the alignment pins 134.

A durable, transparent, flexible document holding sheet or cover 170 is provided for holding the drawing 46 in place on the drum. Document holding sheet 170, as well as cover strip 140, may be of a material such as MYLAR, produced by the Dupont Corporation. One edge of the sheet 170 is held in place between the retainer 142 and the protective cover strip 140. The other edge 174 of the sheet 170 is detachably held to the drum by a cover hold down clamp 176. Specifically, the edge 174 is inserted within a slot 178 provided in the hold down clamp 176 and is secured in place, as by adhesive 180. Plural leaf springs 182 are spaced along the drum within the channel 130. The springs 182 are held in place by an elongated spring retainer 184 which overlies the clamping element. The fasteners 158 also hold the spring retainer in place. To releasably secure the cover in place after a print 46 has been placed on the drum 10, a handle portion 188 of the hold down clamp 176 is gripped. This handle is pulled in the direction of the lip 154 until a spring engaging flange 194 of the hold down clamp 176 engages an exposed free end 198 of the spring 182. The interior surface 196 of the flange 194 conforms to the shape of the spring free end 198 so that these elements are positively locked together and the print 46 is held tightly against the drum surface. The spring retainer 184 is also provided with a land 200 which bears against the hold down clamp 176 when these elements are locked. Following the digitization of the print 46, the handle 188 is grasped and pulled outwardly to release the hold down clamp 176 from the spring 182. When released, the document holding sheet 170 may be lifted and the print removed.

The calibration strip 80 and its method of manufacture will next be described in greater detail with reference to FIGS. 4, 5 and 6. Again, the calibration strip 80 has a surface with a high contrast, high resolution, optical pattern thereon. Specifically, the illustrated embodiment, the pattern includes plural black and white discrete blocks 82 spaced along the length of the calibration strip 80. All but the end most blocks of the pattern have a width (FIG. 7) which, when added with a space 209, corresponds to the width 207 of the field of view of the array 53. In addition to the blocks 82, an end region of the calibration strip 80 is provided with a drum shaft indexing pattern 210 (FIG. 4). This indexing pattern provides a reference for use in adjusting the position of an electrical indexing pulse generated by the optical encoder 94, once per revolution of the drum. In addition, a magnification region 212, comprising a series of narrow parallel black and white lines, is provided for use setting the magnification of the optics of the scanning head 50.

Although other methods of manufacturing the calibration strip will be apparent to those skilled in the art, a preferred approach is as follows.

Initially, referring to FIGS. 4, 5 and 6, a base or blank strip 214, such as of aluminum, is obtained. The blank is of the desired width of, and is somewhat longer than the desired length of, the finished calibration strip. This blank 214 is manufactured by shearing to minimize warpage. A circular fixturing hole 216 (FIG. 4) is provided at one end of the blank and a fixturing slot 218 is provided at the other end. These fixturing openings are dimensioned and positioned along the center of the blank within tight tolerances, for example dimensionally within ±0.005 inches. A conventional sheet metal punch may be utilized to form these fixturing openings. At this point, the blank is sanded and anodized to provide a smooth surface. Thereafter, a strip (FIG. 6) of film 217 or other photosensitive material, on which the optical pattern is to be formed, is prepared. This film 217 is slightly wider than the width of the blank. Although a number of suitable photosensitive materials may be used, one specific example is a gravure print film which is identified by the Trademark CHRONOPAQUE H-CPH-7 and is produced by the Dupont Corporation. The film 217 is secured, as by an adhesive layer 219, to one surface of the blank 214. One example of a suitable adhesive is an Adhesive Transfer Tape Number Y-9460, available from the 3M Company. After the film 217 is secured in place, it is trimmed so that it is flush with the side edges of the blank.

A glass master scale containing a negative of the optical pattern is then utilized to expose the film. It is desirable that such a scale be extremely accurate, for example within ±0.001 inches over thirty five inches, the approximate finished length of the illustrated strip. Such a glass scale can be obtained from a scale manufacturer, such as Dynamics Research Corporation. The calibration strip, with the unexposed film 217, is positioned within a vacuum frame. The fixturing holes 216, 218 are engaged by pins of the vacuum frame so as to hold the calibration strip in place. The glass master is then placed in the vacuum frame. The glass master has corresponding fixturing holes so that it is aligned by the vacuum frame pins over the calibration strip. Once in place, the film 217 is exposed to light, with the glass master acting as a negative.

In addition to containing the pattern for the blocks 82, the encoder indexing pattern 210 and the magnification adjustment pattern 212, the glass master also provides a pattern for producing donut shaped images 220 (FIG. 5), at locations where the openings 136 and 146 are to be formed. After the film is exposed, an optical sensing punch, such as a Spartanics Model 38 Automatic Registration Pilot Hole Punch Press, is utilized to grip the calibration strip and align the patterns 220, one at a time, with a punch. The punch then forms the respective openings 136, 146 in the calibration strip. These openings are accurately positioned at their desired locations, for example within ±0.0015 inches. As a result, the distance between center of the alignment holes 136 and the edges 84 of the pattern is precisely established. Therefore, when mounted to the alignment pins 134 on the drum, the edges 84 are accurately aligned with the axis of the drum.

Following the forming of openings 136 and 146, the calibration strip 80 is cut to length, for example by shearing the strip 80 along lines 222, 224 (FIGS. 4, 5). To complete the process, optional clamps or tabs 226 are compressed over the ends of the calibration strip. Under certain conditions, due to changes in temperature and humidity, the film 217 and base 214 may expand and contract slightly. Because of the differences in these materials, expansion and contraction does not take place at the same rate. Therefore, shear stresses arise in the adhesive layer 219 between the base 214 and film 217. If these stresses exceed the bond strength of the adhesive, the film 217 may slip relative to the base 214. This can cause inaccuracies in the calibration strip. The clamps 226 prevent such relative slipping. Of course, with a sufficiently strong adhesive, that is one with a bond strength greater than the shear forces, slipping is prevented without requiring clamps 226.

Figure 8:
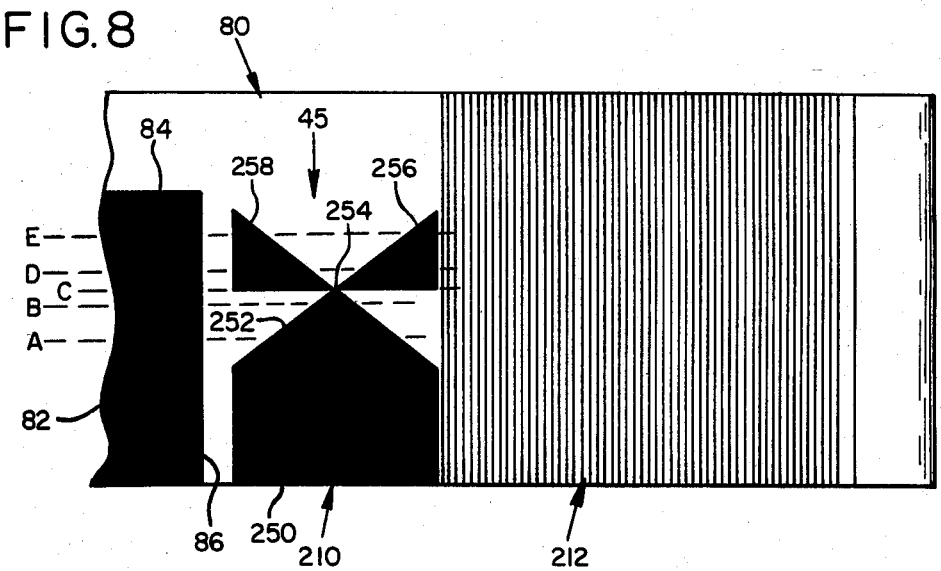
FIG. 8 is a top plan view of one end section of the calibration strip of FIG. 1, showing an encoder indexing and scanner focusing patterns of the calibration strip.
Figure 9:
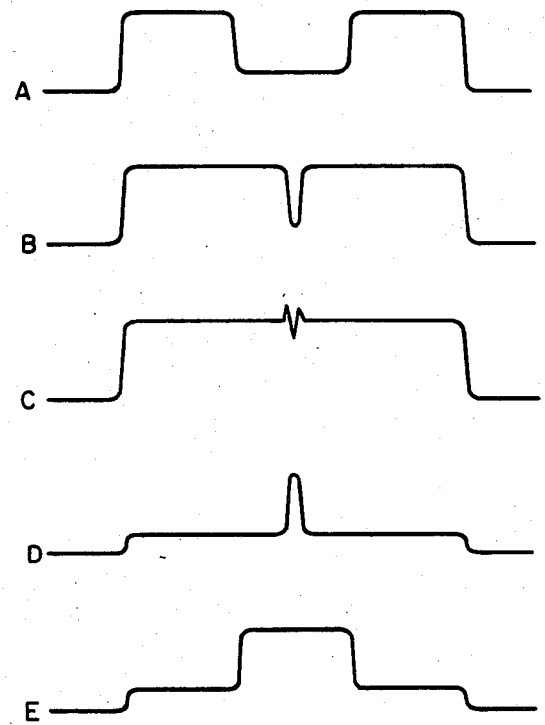
FIG. 9 illustrates wave forms generated by optically scanning the encoder indexing pattern of FIG. 8.

The operation of the calibration strip 80 is best understood with reference to FIGS. 7, 8 and 9. Initially, the drum 10 is stopped with the calibration strip 80 positioned within the field of view of the optical array 53. The scanner head 50 is shifted along the carriage arm 56 until it is viewing the magnification region 212 of the calibration strip 80. When in this position, the lens of the scanning optics is adjusted to the proper magnification.

Linear calibration of the apparatus, along the X-axis, is accomplished as follows. The scanner head 50 is moved to its far left position in FIG. 1. The stepper motor 60 (FIG. 1) then shifts the scanner 50 until the center photodetector 234 (FIG. 7) of the array 53 is approximately aligned with the edge 86 of the first block 82, but slightly short of this edge. The stepper motor is then stepped in single increments until the threshold level of the detector 234 is exceeded. This corresponds to the location of the edge 86 of this first block 82. When in this position, the first photo detector 236 of the array is viewing along the right side of a line 238 (FIG. 7) which passes through the point of origin of an X-Y cartesian coordinate system. Following the detection of this first edge, the stepper motor then moves the scanning head 50 until photodetector 234 detects the edge 86 of the next calibration block 82. In this manner, each of the edges 86 is located. Furthermore, the number of microsteps, from the starting point, required to reach each of these edges 86 is stored. Thereafter, the scanner head 50 may be positioned at each of the stored locations without having to stop the rotation of the drum and search for an edge 86. Thus, a convenient and easy method is provided for linearly calibrating the apparatus along an X-axis.

The width of the scan, that is the swath or distance between the lines 238 and 242 (FIG. 7) corresponding to the width of the area scanned by the array 53 between the first and last photodetectors 236, 241, is equal to the width 207 of all but the end most pattern blocks 82. Therefore, by moving the scanning array 53 between positions corresponding to the location of the edges 86, adjoining swaths abut one another, but do not overlap.

To adjust the position of an electrical index pulse from the optical encoder, the scanning head 50 is moved to position the array 53 so that the indexing pattern 210 moves past the field of view of the array as the drum is rotated. The illustrated pattern 210, progressing upwardly from the bottom of FIG. 8, includes a lower dark region having a lowermost rectangular portion 250 which is combined with a central dark isosceles triangular region 252. The triangular region terminates in an apex 254. The pattern also includes right and left dark right triangular regions 256, 258 which start from the apex 254 and have bases which are parallel to the axis of the drum. Thus, as the drum is stepped in microsteps in the direction of arrow 45, the scanner array first senses an entirely dark area across the width of the indexing pattern. As the drum is stepped, the dark area progressively decreases in width, until, at the apex 254, the dark area switches from a minimum width to a maximum width. Then, as the triangular regions 256, 258 move past the scanner array, the dark area again progressively decreases in width. When the outputs of the photo detectors of the array 53 are displayed on a screen, the waveforms shown in FIG. 9 result. These waveforms are labeled A through E and correspond to the light detected by the array across the index pattern at locations A through E in FIG. 8. The precise location of the apex 254, corresponding to scanning at location C and the waveform C in FIG. 9, is easily identifiable. When this location has been identified, the optical encoder is adjusted to produce an index pulse each time the drum position, relative to the array, coincides with a line parallel to edge 84 and extending through apex 254. Because this line leads the scan trigger edges 84, whenever the encoder index pulse is generated, the scanning system is signalled to look for a scan trigger edge 84 which will soon pass the field of view of the array.

An engineering print 46 is then mounted to the drum and rotation of the drum commences. The scanner 50 is moved to its initial microstep stored position as shown in FIG. 7. When so positioned, the first thirtytwo photodetectors of the array 53 are approximately centered over a block 82 as the block rotates past the field of view of the array. The edges 84 are detected by monitoring and averaging the outputs of these first thirty-two photodetectors so that an accurate determination of the edge 84 is made. Upon detection of the scan trigger edge 84, the apparatus commences encoding of data. Because the edges 84 are parallel to the drum axis, an orthogonal scanning view port is provided for the optical array 53. After a swath of the drawing has been scanned, the drive motor 60 shifts the scanning head 50 in the X-direction to a position for scanning an adjacent swath of data. Thus, the calibration strip is used to linearly calibrate an optical digitizer and also to establish an orthogonal coordinate system for the digitization of data.

Having illustrated and described the principles of my invention with reference to one preferred embodiment, it should be apparent to those persons skilled in the art that such invention may be modified in arrangement and detail without departing from such principles. I claim as my invention all such modifications as come within the true spirit and scope of the following claims.

I claim:

1. A calibration apparatus for an optical documents digitizer having a drum which is rotatable about an axis and an optical array of photo detectors for scanning the drum, the optical array having a scanning width comprising:

an elongated strip;

the strip having an optical pattern of contrasting light and dark areas on one surface thereof, the pattern including plural discrete blocks, each of the blocks having first and second orthogonal edges, the first edges being positioned along a scanning reference line;

the strip being adapted for mounting to the rotatable drum of the digitizing apparatus with the first edges, and thereby the scanning reference line, parallel to the axis of the drum.

2. A calibration apparatus according to claim 1 in which the second edges are spaced apart a distance which corresponds to the scanning width of the optical array.

3. A calibration apparatus according to claim 1 in which the blocks are rectangular.

4. A calibration apparatus according to claim 1 in which the optical pattern includes an optical encoder indexing pattern.

5. A calibration apparatus according to claim 4 in which the optical encoder indexing pattern is shaped and positioned relative to the scanning reference line such that, as the indexing pattern is scanned by the optical array, the optical array provides a recognizable output signal ahead of the scanning of the scanning reference line by the optical array.

6. A calibration apparatus according to claim 1 in which the optical pattern includes an optical encoder indexing pattern at one end, the optical encoder indexing pattern having a first region of one of the two dark or light colors, the first region tapering in width to an apex location when scanned in a first direction along a center line through the center of the indexing pattern, the center line being normal to the scanning reference line, the optical encoder indexing pattern having a second region of the other of the two dark or light colors, the second region becoming broader in width when scanned from the apex, in the first direction along the center line.

7. A calibration apparatus according to claim 6 in which the optical encoder indexing pattern is symmetrical about the center line.

8. A calibration apparatus according to claim 1 in which the optical pattern includes an optical encoder indexing pattern at one end of the base, the optical encoder indexing pattern including a first region of one of the two contrasting colors, the first region being comprised of a rectangular portion and an isosceles triangular portion which terminates at an apex, the optical encoder indexing pattern also including second and third right triangular regions of the one color, such triangular regions having bases parallel to the scanning reference line and intersecting the apex.

9. A calibration apparatus according to claim 4 in which the optical pattern includes a scanner lens magnification adjustment pattern which is comprised of a series of parallel light and dark lines which are parallel to the second edges.

10. A calibration apparatus according to claim 1 in which the strip comprises a base of a first material and a film secured to the base, the film having the optical pattern thereon.

11. A calibration apparatus according to claim 10 in which the base is of aluminum.

12. A calibration apparatus according to claim 1 in which the strip is provided with mounting openings which are spaced a predetermined distance from the scanning reference line.

13. In an optical document digitizer which has a drum for supporting documents to be digitized, the drum being rotatable about an axis, a linear array of photosensitive scanning elements for scanning a portion of the document as the drum is rotated and for generating data corresponding to images on the document being scanned, a mounting mechanism for mounting the array for shifting along a carriage in a direction generally parallel to the axis of the drum and corresponding to an X-coordinate axis of an X-Y catesian coordinate system, a calibration apparatus comprising:

a calibration strip having an optical pattern of contrasting light and dark areas on one surface thereof, the pattern including plural discrete blocks, each of the blocks having first and second orthogonal edges, the first edges being in a scanning reference line;

means for mounting the calibration strip to the drum with the first edges, and thus the scanning reference line, parallel to the axis of the drum such that, as the drum is rotated, the array detects the first edges and provides a reference for the Y-coordinate axis of the cartesian coordinate system.

14. An apparatus according to claim 13 in which the strip includes plural spaced apart mounting openings along its length, such mounting openings being along a line which is parallel to the scanning reference line;

the means for mounting the calibration strip to the drum comprising pins mounted to the drum in alignment with the axis of the drum, such pins being insertable through the mounting openings to thereby align the first edges and the reference line with the drum axis.

15. A method of calibrating an optical document digitizer having a rotatable drum on which documents to be digitized are held, the digitizer including an optical scanner for scanning the document, the method comprising:

mounting a calibration strip to the rotatable drum, the calibration strip including an optically recognizable pattern of contrasting light and dark colors formed in discrete blocks, each of the blocks having first and second orthogonal edges, the first edges being positioned in a line, the step of mounting the calibration strip comprising the step of mounting the strip with the first edges parallel to the drum axis;

positioning the calibration strip in the field of view of the scanning array while the drum is stopped;

operating a drive mechanism to drive the array in a first direction from a reference position and along an X-coordinate axis;

detecting the second edges as the array is moved in the first direction; and storing information corresponding to the extent the drive mechanism is operated to move the array to each of the second edges.

16. A method according to claim 15 further including the steps of rotating the drum and detecting the first edges as the drum is rotated, the detected first edges comprising a reference for a Y-coordinate axis which is orthogonal to the X-coordinate axis.

* * * * *